US012171698B2

(12) United States Patent
Davis et al.

(10) Patent No.: US 12,171,698 B2
(45) **Date of Patent: *Dec. 24, 2024**

(54) FUNERARY VIEWING SYSTEM AND METHOD

(71) Applicant: VANDOR GROUP, INC., Richmond, IN (US)

(72) Inventors: Justin F. Davis, Richmond, IN (US); Gerald H. Davis, Fountain City, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,083

(22) Filed: Sep. 25, 2023

(65) Prior Publication Data

US 2024/0009056 A1 Jan. 11, 2024

Related U.S. Application Data

(63) Continuation of application No. 17/510,023, filed on Oct. 25, 2021, now Pat. No. 11,766,374, which is a (Continued)

(51) Int. Cl.
*A61G 17/04* (2006.01)
*A61G 17/00* (2006.01)
*A61G 17/007* (2006.01)

(52) U.S. Cl.
CPC .......... *A61G 17/042* (2016.11); *A61G 17/001* (2017.05); *A61G 17/004* (2016.11); *A61G 17/0073* (2013.01)

(58) Field of Classification Search
CPC ................ A47G 17/042; A47G 17/001; A47G 17/0073; A47G 17/028; A47G 17/034; A47G 17/044; A47G 17/004
See application file for complete search history.

(56) References Cited

U.S. PATENT DOCUMENTS 3,613,189 A 10/1971 Kirby
3,810,282 A 5/1974 Doggett
(Continued)

FOREIGN PATENT DOCUMENTS

GB 2286583 A 8/1995

OTHER PUBLICATIONS

Extended European Search Report for related case EP 19209143.7, dated Mar. 24, 2020. (2 Pages).

(Continued)

*Primary Examiner* — William L Miller
(74) *Attorney, Agent, or Firm* — Maginot, Moore & Beck LLP

(57) ABSTRACT

A funerary method includes disposing a deceased adult human body in supine position on an insert having side walls and end walls. The method further includes providing the insert on a tray having two end panels and a plurality of side panels affixed to a bottom panel, and inserting a first edge of a first fabric segment between a side panel of the tray and a side wall of the insert. The first fabric segment is used to cover at least a portion of a top edge of at least the first side wall of the insert and at least a portion of the deceased human body, such that the deceased human body is sufficiently visible for identification. Thereafter, the insert and the deceased human body are removed from the tray.

20 Claims, 10 Drawing Sheets

Related U.S. Application Data continuation of application No. 16/684,024, filed on Nov. 14, 2019, now Pat. No. 11,154,448.

(60) Provisional application No. 62/767,498, filed on Nov. 14, 2018.

(56) References Cited

U.S. PATENT DOCUMENTS

| | | | | |
|---|---|---|---|---|
| 4,177,543 | A | 12/1979 | Angermann | |
| 7,302,743 | B2 | 12/2007 | Fash | |
| 7,337,484 | B2 | 3/2008 | Cox | |
| 7,350,278 | B2 | 4/2008 | Davis et al. | |
| 8,104,151 | B2 | 1/2012 | Cox et al. | |
| 8,127,414 | B2 | 3/2012 | Rankin | |
| 8,375,535 | B2 | 2/2013 | Cox et al. | |
| 8,607,423 | B2 | 12/2013 | Davis et al. | |
| 8,914,953 | B1 | 12/2014 | Thacker | |
| 9,539,161 | B2 | 1/2017 | Davis | |
| 9,597,248 | B2 | 3/2017 | Davis et al. | |
| 9,872,809 | B1 | 1/2018 | Davis et al. | |
| 10,500,117 | B2 | 12/2019 | Davis et al. | |
| 11,039,972 | B2 | 6/2021 | Davis et al. | |
| 11,141,338 | B2 | 10/2021 | Davis et al. | |
| D935,130 | S * | 11/2021 | Davis | D99/8 |
| 11,311,443 | B2 | 4/2022 | Davis et al. | |
| 11,344,464 | B2 | 5/2022 | Davis et al. | |
| 2010/0218351 | A1 | 9/2010 | Rankin | |
| 2011/0107567 | A1 | 5/2011 | Cox et al. | |
| 2013/0160258 | A1 | 6/2013 | Davis et al. | |
| 2014/0123450 | A1 | 5/2014 | Jenson | |
| 2016/0235611 | A1 | 8/2016 | Davis et al. | |
| 2017/0281448 | A1 | 10/2017 | Davis et al. | |
| 2020/0146920 | A1 | 5/2020 | Davis et al. | |
| 2023/0404832 | A1 * | 12/2023 | Davis | A61G 17/042 |
| 2024/0108527 | A1 * | 4/2024 | Davis | A61G 17/004 |

OTHER PUBLICATIONS

Extended European Search Report for related case EP 19209053.8, dated Mar. 26, 2020. (2 Pages).

* cited by examiner

FUNERARY VIEWING SYSTEM AND METHOD

CROSS-REFERENCE TO RELATED APPLICATIONS

This application is a continuation of U.S. patent application Ser. No. 17/510,023, filed Oct. 25, 2021, which in turn is a continuation of U.S. patent application Ser. No. 16/684,024, filed Nov. 14, 2019, now U.S. Pat. No. 11,154,448, which in turn claims the benefit of U.S. Provisional Patent Application Ser. No. 62/767,498, filed Nov. 14, 2018, the entire contents of both of which are incorporated by reference herein.

FIELD OF THE INVENTION

This invention relates generally to systems and methods for funerary viewing.

BACKGROUND

The cost of traditional burial-based funeral processes has led to an increase in cremation. Cremation can eliminate the need for a burial plot and full burial casket, thereby reducing costs substantially. Cremation funeral plans can have various types of ceremonial approaches. In an elaborate format, a full, decorative wood casket may be used and consumed in the cremation plans, which allows for traditional wake. In some cases, the deceased may be viewed in a rental casket, and then removed for the cremation process. In such a case, a casket insert is often used to transport the body to and from the rental casket, and hold the body within the rental casket. Examples of casket inserts are shown in U.S. Pat. Nos. 7,337,484 and 8,104,151. The use of the insert allows the rental casket to be re-used.

While the use of an ornate rental casket in connection with a rental insert provides substantial cost savings, the cost of embalming remains. A traditional funerary wake or viewing is seldom possible without embalming because of the duration of such events. To avoid the costs associated with embalming, many people have chosen to eliminate the traditional wake, and instead move the body directly from the morgue or hospital to the cremation facility. This nevertheless typically involves an identification viewing, typically at the morgue or hospital. Once the identification is completed, the body is taken direction to the cremation facility.

There is an increasing need, however, for an opportunity to briefly view and say goodbye to a loved one, for example, by the immediate family, in a suitable presentation that exceeds that normally available in a morgue or hospital. Ideally, the viewing would not require embalming, but would allow for an improved viewing experience.

SUMMARY OF THE INVENTION

At least some embodiments of the invention employ a rental or reusable viewing tray that is made of wood or metal, and may have multiple decorative features. The tray would be low profile, lower than that of a casket, so that the body may be easily viewed, and such that the tray may be easily transported to different settings. At least other embodiments involve a funerary display method that facilitates a more portable, low cost way to add dignity in a simplified viewing event.

A first embodiment is a funerary method that includes disposing a deceased adult human body in supine position on an insert, the insert having side and end walls. At least one side wall and the end walls all have approximately the same height. The insert is provided on a tray having two end panels and a plurality of side panels affixed to a bottom panel, wherein the end panels and side panels are constructed primarily of wood or metal. The method also includes employing at least a first fabric segment to cover at least a portion of a top edge of at least one sidewall of the insert and at least a portion of the deceased human body, such that the deceased human body is sufficiently visible for identification. The method also includes later removing the insert and the deceased human body from the tray. A second insert having a second deceased human body is then disposed thereon on the tray.

A second embodiment is a funerary tray for displaying a deceased includes side panels and end panels coupled to a bottom panel to form a tray. The tray has a length and width adapted to receive and reasonably fit a deceased adult human body in the supine position. The vertical distance between a top surface of the bottom panel and a top edge of the first side panel is less than 10 inches. Each side panel is constructed primarily of wood or metal, and includes a first end coupled to the first end panel, a second end coupled to the second end panel, and a top edge and a bottom couple to the bottom panel. Each side panel further includes a recessed channel disposed intermediate the top edge and the bottom edge, and extending from the first end to the second end thereof.

A third second embodiment is a funerary insert kit for use with reusable shell. The insert kit includes a corrugated paper container and at least one fabric segment. The corrugated paper container includes a bottom wall, first and second side walls extending upward from the bottom wall, and first and second end walls extending upward from the bottom wall. The first and second sidewalls, the first and second end walls and bottom wall form an open top container having a width and length configured to reasonably fit an adult human body in supine position. The open top container is configured to fit within the reusable shell. The first fabric segment is affixed to a first rigid substrate. The first rigid substrate configured to fit adjacent an interior surface of at least a first side panel of the reusable shell.

The above-described features and advantages, as well as others, will become more readily apparent to those of ordinary skill in the art by reference to the following detailed description and accompanying drawings.

DETAILED DESCRIPTION

Figure 1:
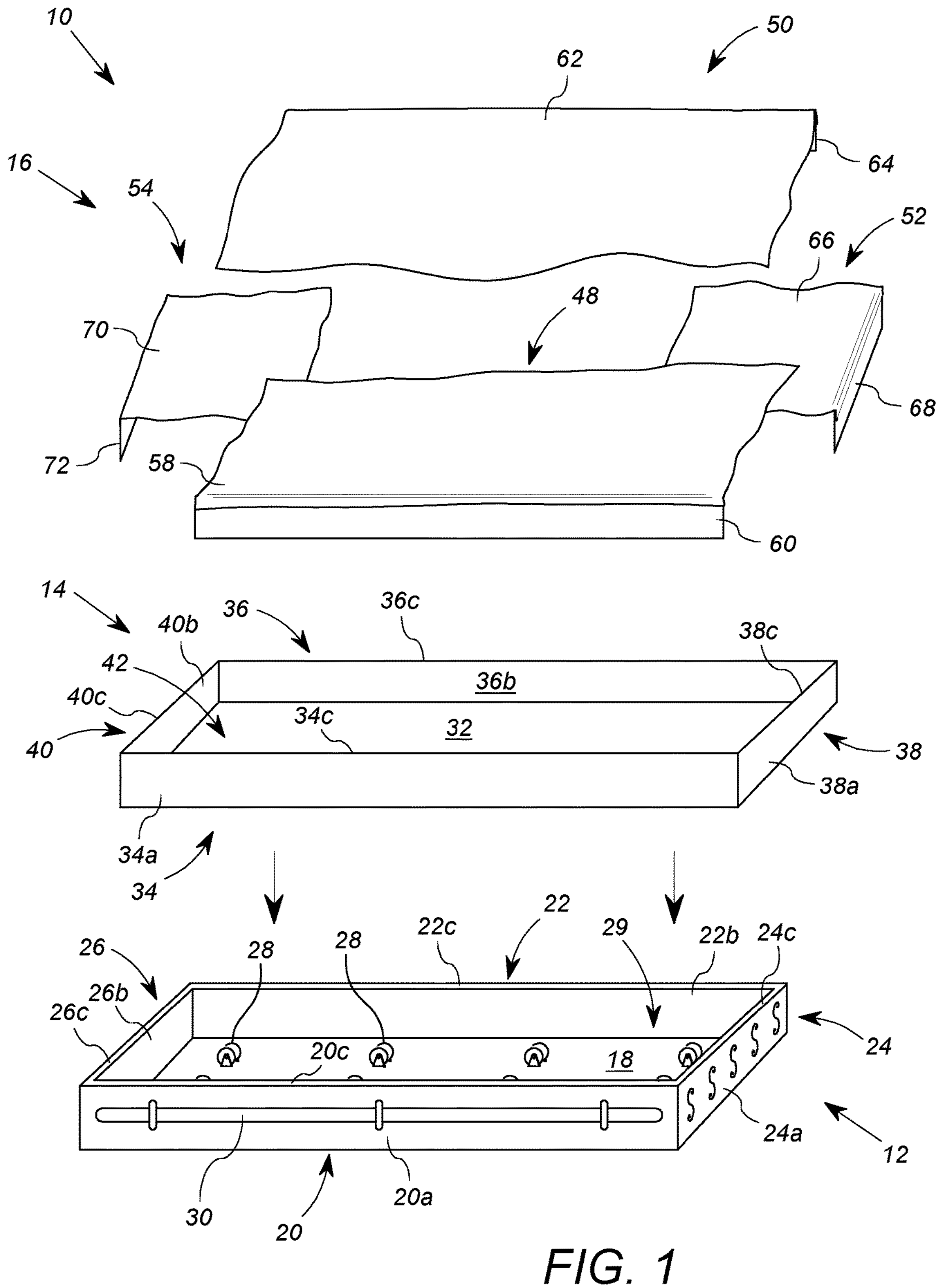
FIG. 1 shows an exploded, perspective view of a system according to a first embodiment.

FIG. 1 shows an exploded, perspective view of a funerary viewing system 10 according to a first embodiment. The system 10 includes a viewing tray 12, an insert 14 and an interior kit 16. In general, the viewing tray 12 is a reusable tray or shell having at least some aesthetic features into which a single-use insert 14 may be temporarily disposed. The single-use insert 14 generally supports and reasonably fits (with respect to width and length, but not necessarily height) a deceased, adult human body lying in the supine position, as is typical for a funerary viewing event. Accordingly, for example, the insert 14 should be at least 72" long and at least 21" wide. The single-use insert 14 may suitably be constructed of an inexpensive but less aesthetically appealing material such as corrugated paper. As will be discussed below in further detail, the interior kit 16 in the embodiment includes one or more cloth assemblies used to cover at least part of the deceased and portions of insert 14.

More specifically, the viewing tray 12 includes a first side panel 20, a second side panel 22, a first end panel 24, and a second end panel 26, all coupled to a bottom panel 18 to form a walled or rimmed tray. The panels 18, 20, 22, 24, 26 define an interior 29. The viewing tray 12 has a length and width adapted to receive and reasonably fit a deceased, adult human body in the supine position. Preferably, to facilitate use of the insert 14, the viewing tray 12 has a length and width adapted to receive and reasonably fit the insert 14, which itself has a length and width adapted to receive and reasonably fit a deceased, adult human body in the supine position.

Each of the side panels 20, 22 and end panels 24, 26 is constructed primarily (more than 50% by weight and/or volume) of wood (including engineered wood products) and/or metal, and includes an exterior surface, an interior surface, and a top edge. Specifically, as shown in FIG. 1, the first side panel 20 has an exterior surface 20*a*, an interior surface 20*b* (not shown but see FIG. 6), and a top edge 20*c*. Likewise, the second side panel 22 has an exterior surface, not visible in FIG. 1, an interior surface 22*b*, and a top edge 22*c*. Furthermore, the first end panel 24 has an exterior surface 24*a*, an interior surface, not visible in FIG. 1, and a top edge 24*c*, and the second end panel 26 has an exterior surface, not visible in FIG. 1, an interior surface 26*b*, and a top edge 26*c*.

The bottom panel 18 includes a top surface 18*a*. In this embodiment, the bottom panel 18 includes a plurality of roller assemblies 28 having rollers configured to support and facilitate lateral movement of the insert 14, as will be discussed below. The roller assemblies 28 extend approximately one inch upward from the top surface 18*a*. It will be appreciated that in other embodiments would not employ roller assemblies, and still other embodiments may employ other structures that facilitate lateral movement, for example, simple wooden skids.

Figure 2:
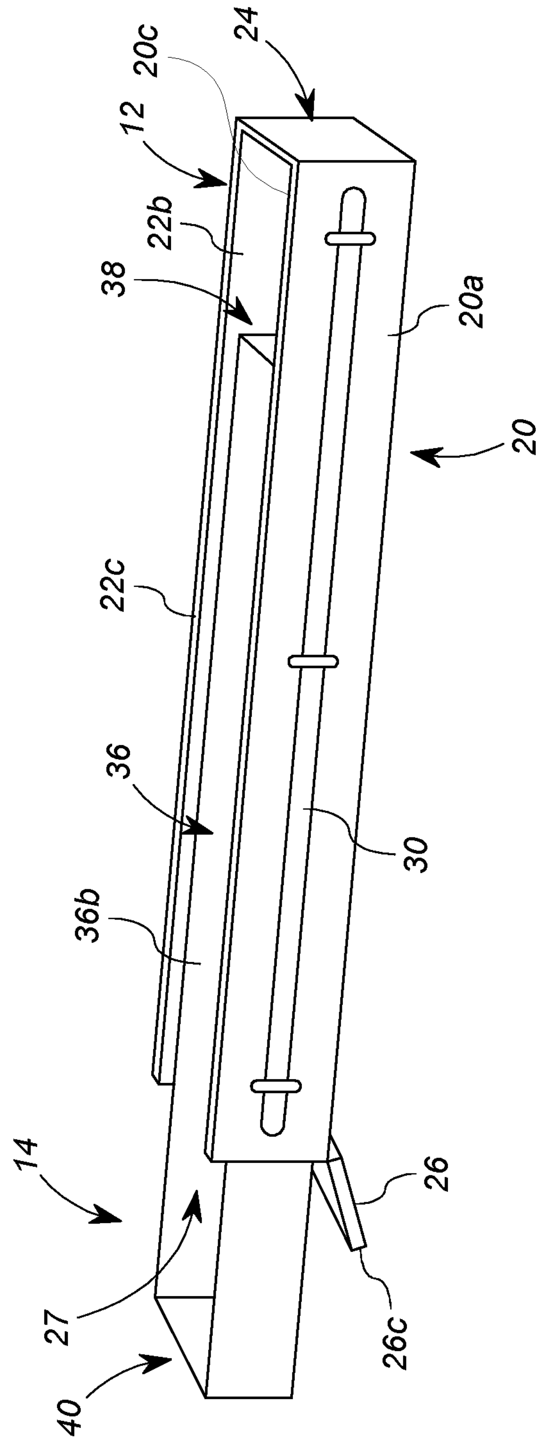
FIG. 2 shows a perspective view of the reusable view tray and casket insert of the system of FIG. 1.

In this embodiment, the second end panel 26 is furthermore pivotally connected to bottom panel 18 to allow the end panel 26 to open as shown in FIG. 2, creating an opening 27 in the tray 12. The opening 27 is sized to allow the insert 14 to be laterally moved into and out of the viewing tray 12 on the rollers 28 via the opening 27. The top of the first end panel 26 may be manually latchable in the upright, closed position shown in FIG. 1, by suitable latching mechanisms, not shown in FIG. 1.

The viewing tray 12 may suitably have some level of ornate external design, including carved wood or shaped metal, and can include decorative and preferably functional handles 30.

In contrast to a typical casket, the vertical distance between a top surface 18*a* of the bottom panel (and/or the top surface of the roller assemblies 28) and the top edge 20*c* of the first side panel 20 is less than ten inches, and preferably less than nine inches. This allows for a more convenient viewing of the face of the deceased, not shown, within the tray 12. In a typical casket, which has more depth, the head of the deceased is enveloped by the casket walls, thereby making it difficult for a mourner to view the deceased, particularly, for example, if the mourner is kneeling. Accordingly, prior art caskets often included mechanisms that elevate the head of the deceased, which coupled with the use of pillows can make the face of the deceased more easily seen. The embodiment described herein employs a low profile tray to allow similar viewing of the face of the deceased without the cost, and weight of an additional bed elevation mechanism.

In addition, the reduced height of the panels 20, 22, 24 and 26 increases portability and reduces shipment and storage space requirements. In this embodiment, the tray 12 does not include an attached lid. In some traditions, a half-lid is often used during a viewing event to cover the foot-end half of the deceased. In conditions where half-lid is desired, a complementarily designed half-lid, not shown, but which could take many designs within the knowledge of those of skill in the art, can be rested (and temporarily secured, if desired) on the top edges 20*c*, 22*c* and 26*c* during a viewing event. The half-lid may suitably be detachable and separately storable.

The insert 14 in this embodiment includes a first side wall 34, a second side wall 36, a first end wall 38, and a second end wall 40 coupled to a bottom wall 32 to form a walled or rimmed tray having an interior 42. In many embodiments, the insert 14 is formed from a corrugated paper blank such that the side walls 34, 36 and end walls 38, 40 fold up from the bottom wall 32 to form the walled tray. The insert 14 has a length and width adapted to receive and reasonably fit a deceased, adult human body in the supine position, and which is adapted to be received in the viewing tray 12 in the manner discussed further below. The walls 34, 36, 38, 40 of the insert 14 further have a height such that the insert 14, when installed in the tray 12 as discussed below, does not extend to a vertical level above at least the top edge 20*c* of the side panel 20 of the tray 12. It will be appreciated that the insert 14 may include (or contain) other structures, such as a plastic liner, or thin wooden reinforcement strips, etc., as is known in the art.

To these ends, for example, the insert 14 may have the design of the casket inserts shown in U.S. Pat. Nos. 7,337,484 and 8,375,535 (specifically, the low-profile third configuration of FIG. 10 of U.S. Pat. No. 8,375,535). Regardless of how constructed, the insert 14 is configured to be consumed in a cremation process with the deceased. The insert 14 may suitably have a lid, not shown, and which preferably would not be used in the viewing event that involves the viewing tray 12.

Each of the side walls 34, 36 and end walls 38, 40 is constructed primarily of corrugated paper, and includes an exterior surface, an interior surface, and a top edge. Specifically, as shown in FIG. 1, the first side wall 34 has an exterior surface 34*a*, an interior surface, not visible in FIG. 1, and a top edge 34*c*. Likewise, the second side wall 36 has an exterior surface, not visible in FIG. 1, an interior surface 36*b*, and a top edge 36*c*. Furthermore, the first end wall 38 has an exterior surface 38*a*, an interior surface, not visible in FIG. 1, and a top edge 38*c*, and the second end wall 40 has an exterior surface, not visible in FIG. 1, an interior surface 40*b*, and a top edge 40*c*.

The interior kit 16 in this embodiment includes first, second, third and fourth cloth assemblies 48, 50, 52, 54. The interior kit 16 may suitably be included with (i.e. packaged with) the insert 14, and is typically not reusable. The first cloth assembly 48 includes a first fabric segment 58 secured to a first rigid substrate 60, and the second cloth assembly 50 includes a second fabric segment 62 secured to a second rigid substrate 64. Likewise, the third cloth assembly 52 includes a third fabric segment 66 secured to a third rigid substrate 68, and the fourth cloth assembly 54 includes a fourth fabric segment 70 secured to a fourth rigid substrate 72.

Figure 3:
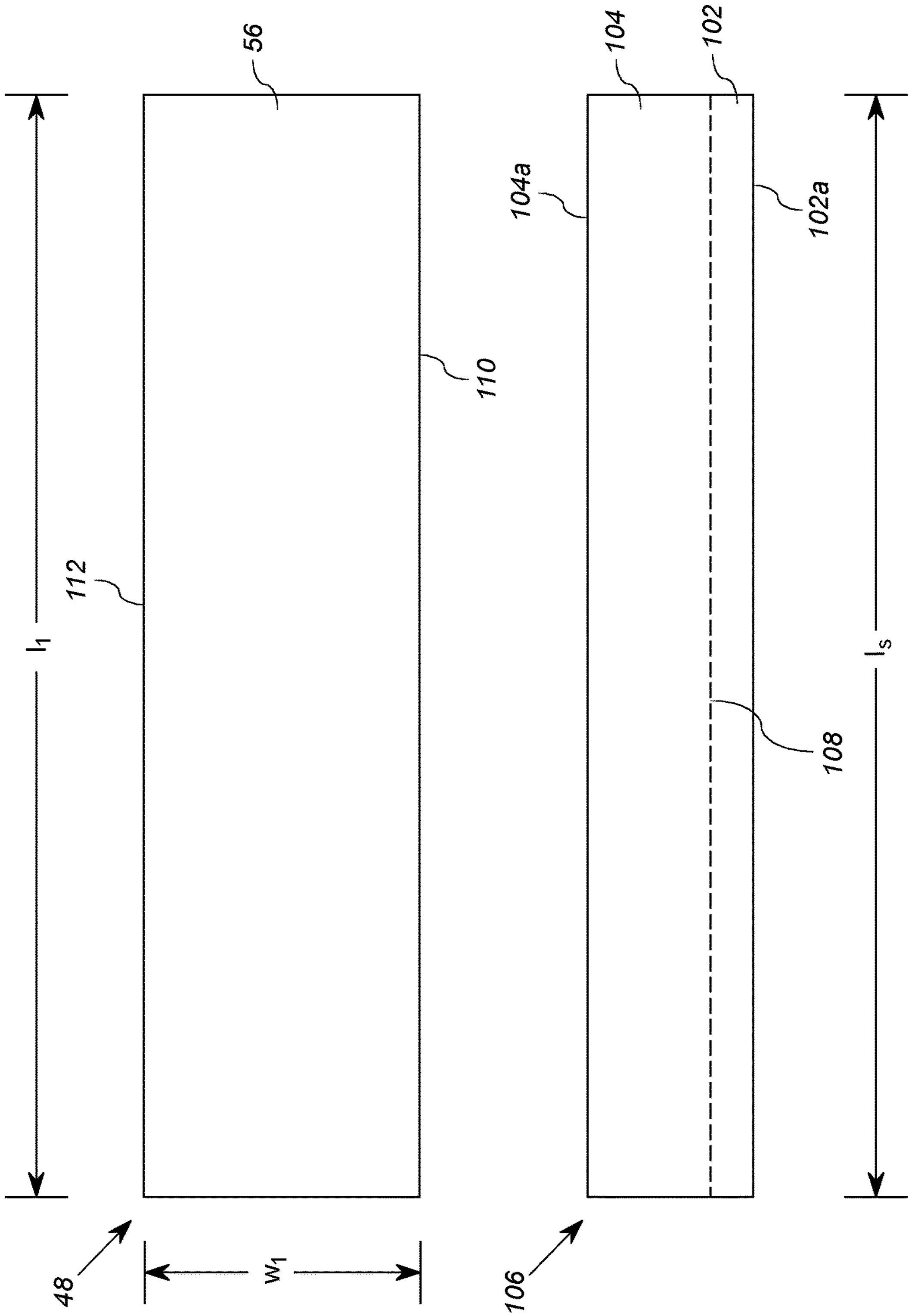
FIG. 3 shows an exploded view of an unassembled exemplary cloth assembly of the first system of FIG. 1.
Figure 4:
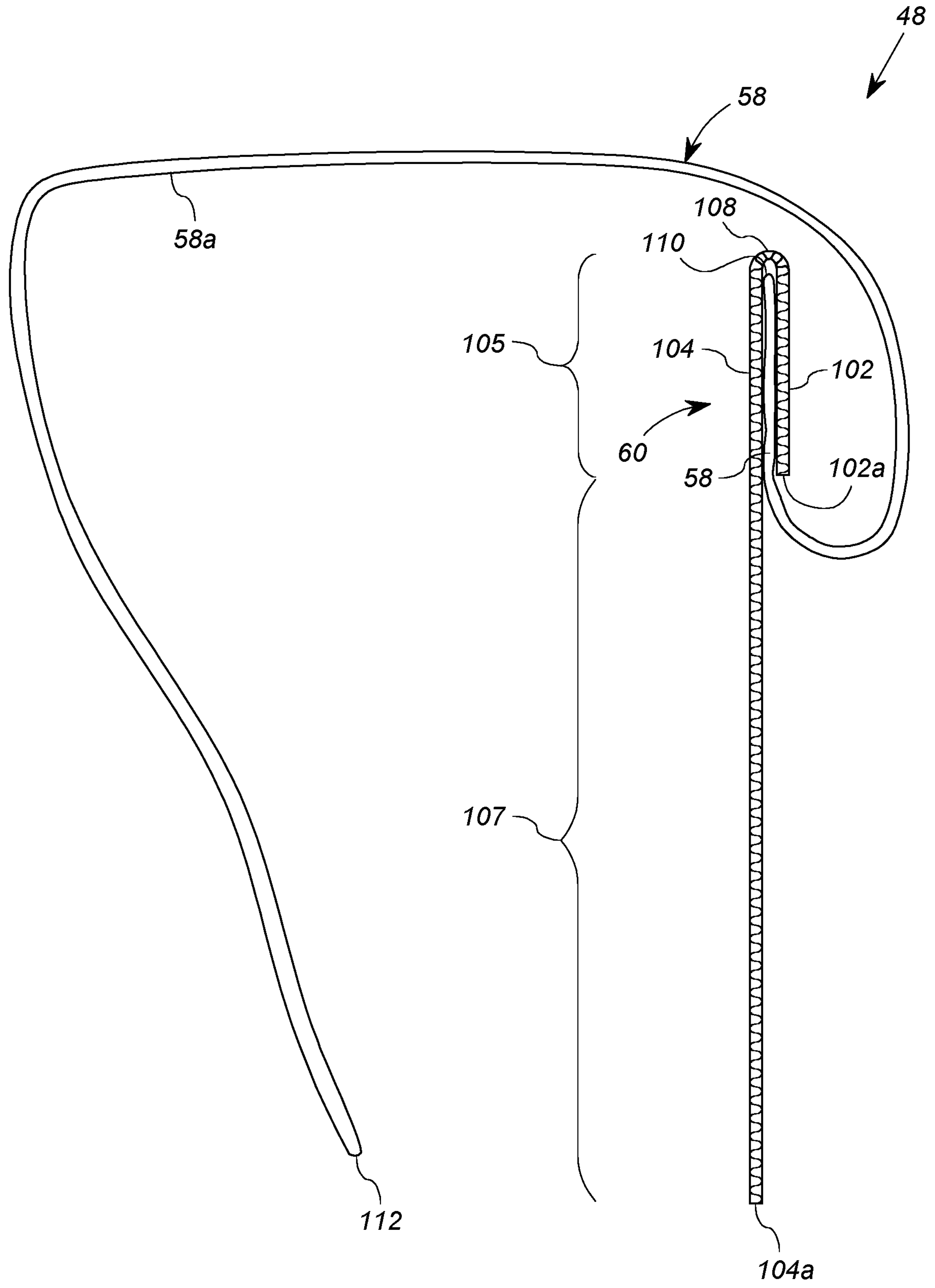
FIG. 4 shows a side plan view of the cloth assembly of FIG. 3.

FIG. 3 shows a plan view of first cloth assembly 48 in an unassembled state. FIG. 4 shows a side plan view of the first cloth assembly 48 fully assembled. With reference to FIG. 3, the first fabric segment 58 has a first length $l_1$ and a first width $w_1$, and includes a first lengthwise edge 110 and a second, opposite lengthwise edge 112. The first fabric segment 58 preferably performs function of a "skirt" of a casket (partially covering the deceased), as will be discussed below. The first fabric segment 58 may be made up of multiple layers of flexible sheet, such as a crepe layer in combination with a woven or non-woven fabric layer and/or padding, suitably stitched together using known methods.

As shown in FIGS. 3 and 4, the first rigid substrate comprises a lengthwise folded cardboard blank 106 having a first portion 102 lengthwise folded along a fold edge 108 over a second portion 104 to define a sleeve 105. The first rigid substrate 60 in this embodiment has a length $l_s$. The portions 102, 104 have uneven widths in this embodiment, and each has a corresponding lengthwise edge 102*a*, 104*a*. As shown in FIG. 3, the length $l_s$ is roughly equivalent to $l_1$. The lengths $l_1$, $l_s$ may suitably be approximately equal to, but slightly less than, the length of the first side panel 20. The width of the smaller portion 102 defines the width of the sleeve 105. The part of the second portion 104 that extends beyond the sleeve 105 to the second lengthwise edge 104*a* forms a stiffening panel 107.

As shown in FIGS. 1 and 4, at least a part of a first lengthwise edge 110 of the first fabric segment 58 is secured to the substrate 60 along the substrate length $l_s$ within the sleeve 105. The first lengthwise edge 110 is secured, preferably via a fastener 114 such as a staple. Specifically, the fastener 114 extends through the first portion 102, through a portion of the first fabric segment 58 within an inch or two of the first lengthwise edge 110, and through the second portion 104. The first fabric segment 58 is secured in position such that the second lengthwise edge 112 can be disposed beyond the lengthwise edge 102*a* of the first portion 102 of the substrate 60, or in other words, out of the sleeve 105, as shown in FIG. 4. The free fabric 58*a* that extends between the lengthwise edge 102*a* of the substrate 60 and the second lengthwise edge 112 of the first fabric segment 58 may be used to cover both the top edge 34*c* of the first side wall 34 of the insert 14 and at least a portion of the body of the deceased, not shown, when the first cloth assembly 48 and the insert 14 are installed in the viewing tray 12. (See also FIG. 6, discussed further below).

Referring again to FIG. 1, the second cloth assembly 50 has substantially the same structure as the first cloth assembly 48 shown in FIGS. 3 and 4. The third cloth assembly 52 similarly has substantially the same structure as the first cloth assembly 48, except that the third cloth assembly 52 has a shorter length that corresponds to the width of the viewing tray 12 (i.e. length of the first end panel 24, which spans the width of the viewing tray 12). The fourth cloth assembly 54 has substantially the same structure as the third cloth assembly 48, including having the same shorter length.

Figure 5:
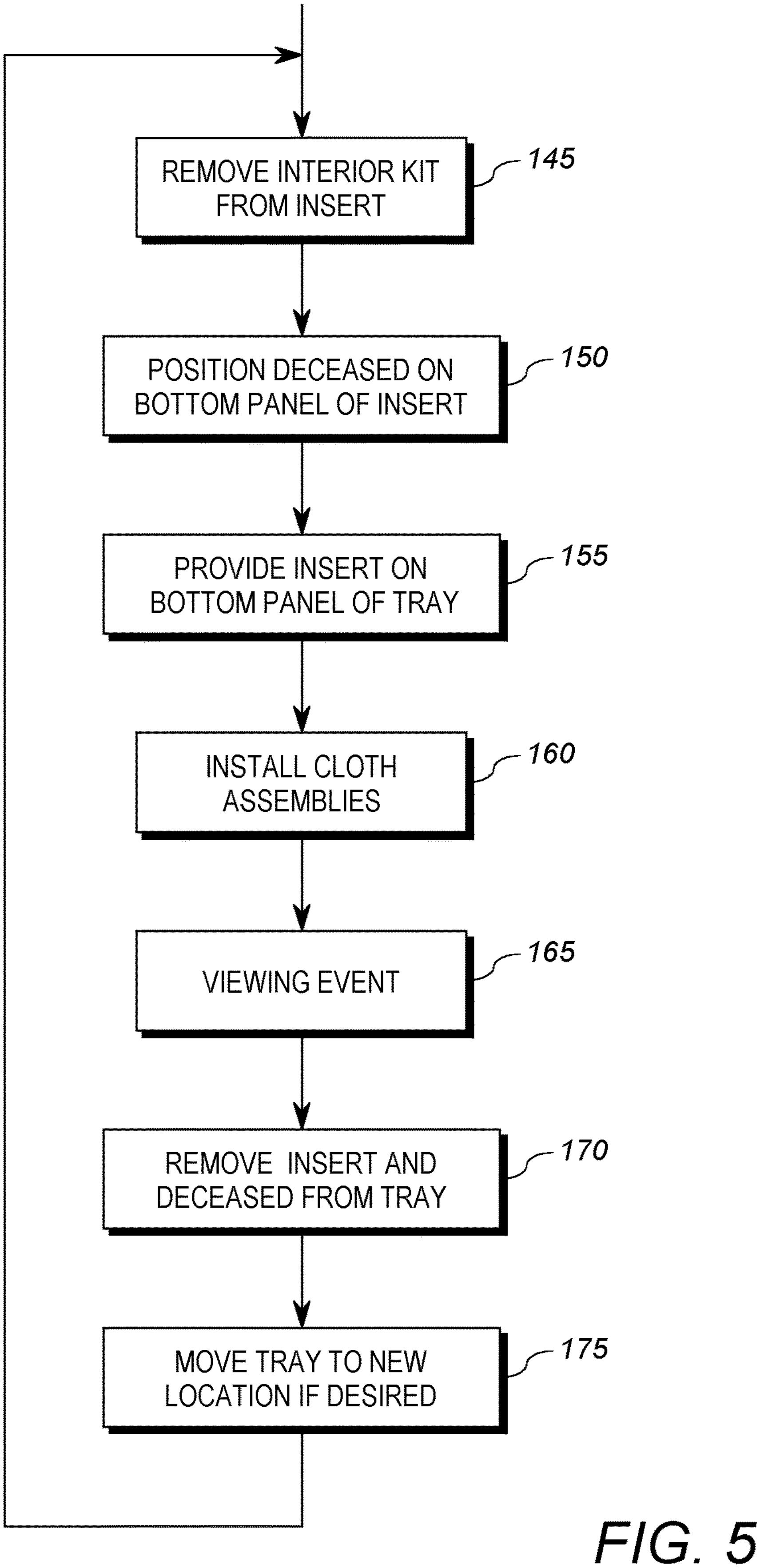
FIG. 5 shows a flow diagram of a funerary method for conducting multiple funerary display events.

FIG. 5 shows a flow diagram of an exemplary method of conducting multiple funerary display events, according to at least one embodiment. In this embodiment, the method of FIG. 5 is described in reference to the funerary display arrangement 10 of FIGS. 1 to 4.

In operation, the insert 14 and interior kit 16 are often packaged together, as they are each intended for a single use. Accordingly, to prepare for the display event, the interior kit 16 is separated from the insert 14, and the insert 14 is prepared to receive the deceased (step 145). In step 150, the deceased is positioned (directly or indirectly) on the bottom wall 32 of the insert 14. In accordance with one preferred embodiment, the deceased is unembalmed. In particular, a typical funeral viewing can be several hours, and often more than one day. Embalming delays decomposition and therefore is typically carried out for typical funeral viewing arrangements. When a body is cremated (or even buried) without a typical funeral viewing event, embalming is not necessary. As discussed above, however, it is often desirable for at least a few family members to view the body, even for a short period. Accordingly, in at least some uses, the deceased is unembalmed during the method of FIG. 5.

Thereafter, in step 155, the insert 14 is provided on the tray 12, i.e. on the bottom panel 18. It will be appreciated that "on the bottom panel" in this embodiment means on roller assemblies 28 that are disposed on and directly supported by the bottom panel 18. In other embodiments, the insert 14 can be provided directly on the bottom panel 18, provided on the bottom panel 18 via skids, or provided on the bottom panel 18 via other intermediary structures supported on the bottom panel 18.

Referring again to the embodiment of FIGS. 1 to 4, the second end panel 26 of tray 12 is pivotably attached so that it can be rotated downward to form a side opening 27 in the tray, as shown in FIG. 2. The insert 14 can then be slid onto the bottom panel 18 through the side opening 27, as also shown in FIG. 2. After, the insert 14 is fully disposed in the interior 29, the second end panel 26 can be pivoted upward such that extends upward from the bottom panel 18, as shown in FIG. 1.

In other embodiments, instead of a pivoting second end panel 26, other arrangements for providing the insert 14 on the tray 12 may be used that avoid having to manipulate the insert 14 into the fully assembled tray 12 shown in FIG. 1. Such methods typically involve at least one of the side panels 20, 22 and/or end panels 24, 26 being rotated or removed, and then subsequently moved so as to extend upward from the bottom panel 18 (i.e. complete the closed tray 12).

Thereafter, in step 160, the cloth assemblies 48, 50, 52 and 54 are installed. Specifically, the first cloth assembly 48 is installed so that the first fabric segment 58 covers at least a portion of a top edge 34*c* of the first side wall 34 of the insert 24 and at least a portion of the deceased human body. To this end, the first lengthwise edge 110 the substrate 60 may be inserted between the interior surface 20*b* of the side panel 20 of the tray 12 and the exterior surface 34*a* of the side wall 34 of the insert 14.

Figure 6:
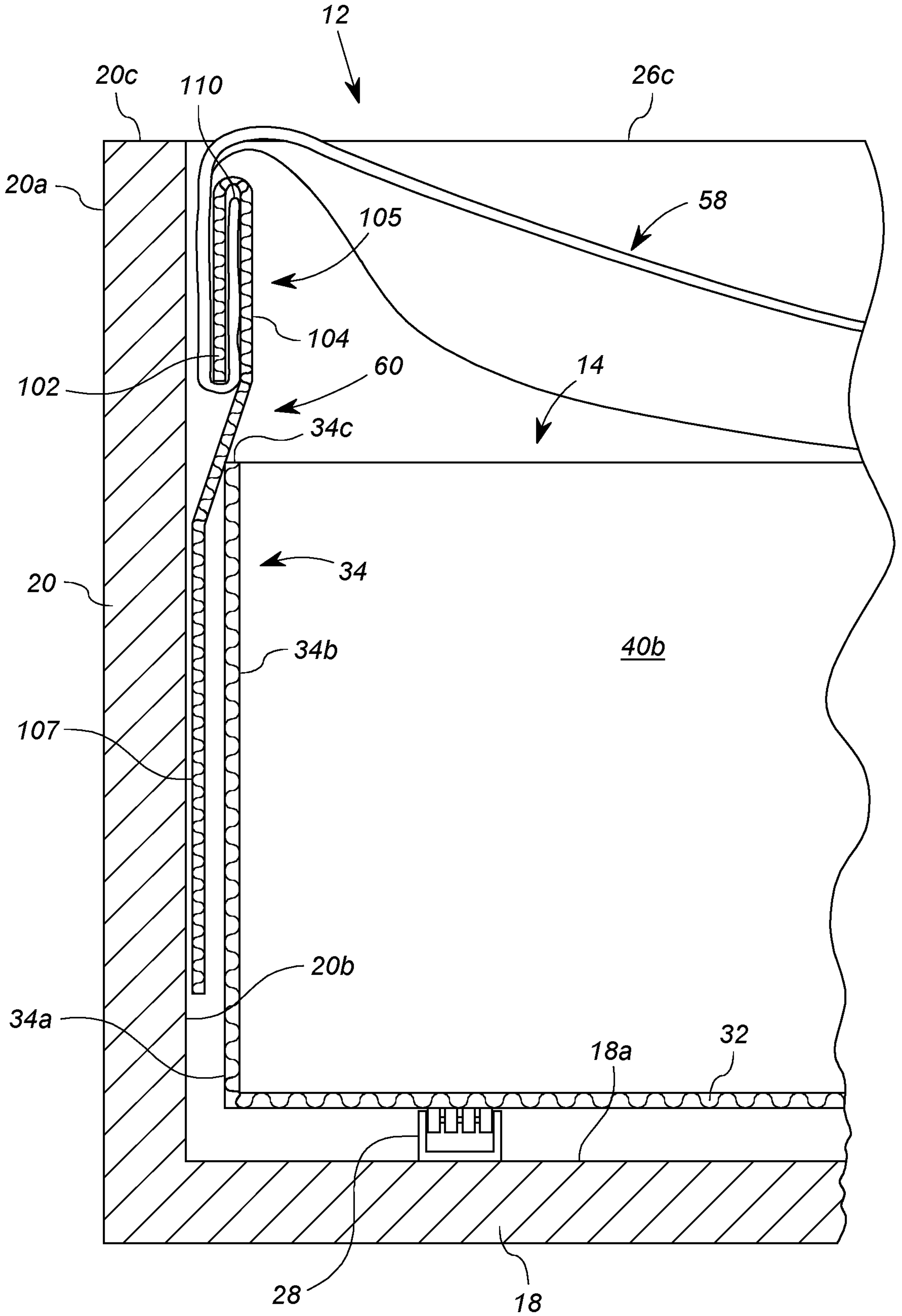
FIG. 6. shows a fragmentary cutaway view of the assembled system of FIG. 1.

FIG. 6 shows a fragmentary cutaway view showing the funerary viewing arrangement 10 wherein the substrate 60 has been inserted between the side panel 20 of the tray 12 and the side wall of the insert 14, after execution of step 160 of FIG. 5 (deceased not shown). In this embodiment, the substrate 60 is inserted such that the fold edge 108 is at the top, and the distal portion of the second portion 104 of the substrate 60 is at the bottom. In other words, the stiffening panel 107 is disposed below the sleeve 105. Moreover, the first portion 102 of the folded substrate 60 is disposed between the second portion 104 and the interior surface 20*b* of the tray 12.

The stiffening panel 107 is disposed adjacent the interior surface 20*b* of the first side panel 20, and in this embodiment is trapped between the interior surface 20*b* and the exterior surface 34*a* of the first side wall 34 of the insert 14. The stiffening panel 107 can deform slightly if necessary, as shown by example in FIG. 6, to insert in the space between first side panel 20 of the viewing tray 12 and the first side wall 34 of the insert 14.

The first fabric segment 58 extends from the first lengthwise edge 110 out of the sleeve 105, around the lengthwise edge 102*a* of the first portion 102 of the substrate 60, along the first portion 102 of the substrate 60, around fold edge 104 and then inward over at least a part of the interior 42 of the insert 14, thus also covering the top edge 34*c* of the first side wall 34 of the insert 14.

Figure 7:
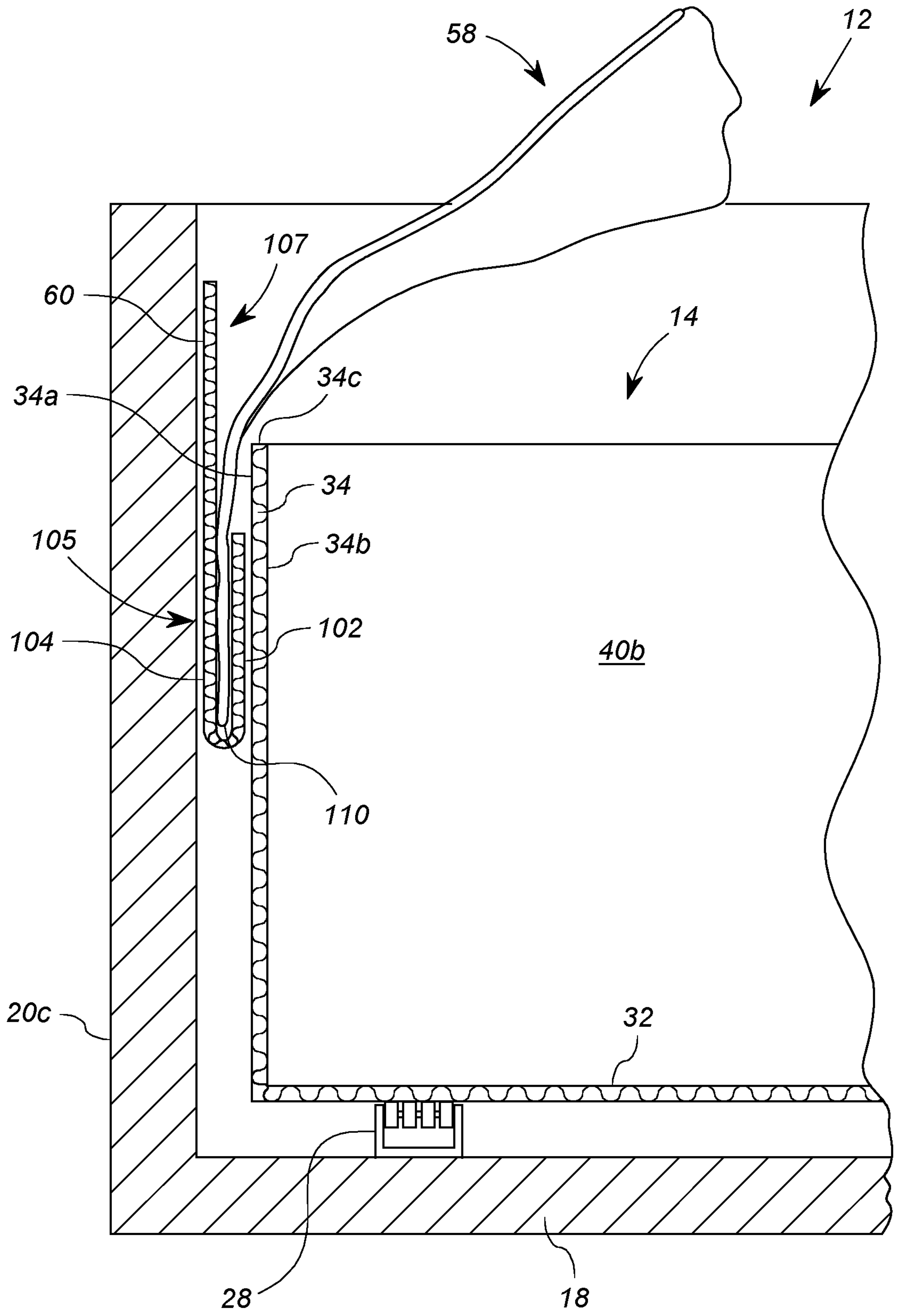
FIG. 7 shows a fragmentary cutaway view of an alternative arrangement of the system of FIG. 1.

In this embodiment, the sleeve 105 sits in the vertical space between the top edge 34*c* of the first side wall 34 and the top edge 20*c* of the first side panel 20. In other embodiments, however, the sleeve 105 may be fully or partially tucked between the first side wall 34 and the first side panel 20. In one alternative shown in FIG. 7, the first cloth assembly 48 may be installed in inverted fashion, such that the sleeve 105 is between the first side wall 34, and the stiffening panel 107 extends upward. In such a case, the first fabric segment 58 extends from the first lengthwise edge 110, out of the sleeve 105, and then generally over the lengthwise edge 104*a* of the first portion 104 of the substrate 60 and over the interior 42.

In any event, referring back to step 160 of FIG. 5, the second cloth assembly 50 is similarly installed between the second side panel 22 of the viewing tray 12 and the second side wall 36 of the insert 14. Once the second cloth assembly 50 is installed, the first fabric segment 58 and second fabric segment 62 are draped toward each other to overlap, and to cover the deceased. The top corners of each of the fabric segments 58, 62 can be folded diagonally back to reveal the face and part of the upper torso as desired. Such positioning of the fabric segments 58, 62 allows for sufficient identification of the deceased, and can be desirable for a short viewing event.

The third cloth assembly 52 is installed between the first end panel 24 of the viewing tray 12 and the first end wall 38 of the insert 14 in the same manner as described above in connection with FIG. 6. The third cloth assembly 52 is proximate the head of the deceased. For the viewing event, the third fabric segment may be inserted below the head of the deceased to cover any otherwise visible portions of the bottom wall 32, in addition to covering the top edge 38*c* of the first end wall 38 of the insert 14.

Similarly, the fourth cloth assembly 54 is installed between the second end panel 26 of the viewing tray 12 and the second end wall 40 of the insert 14 in the same manner as described above in connection with FIG. 6. The fourth cloth assembly 54 is proximate the head of the deceased. For the viewing event, the fourth fabric segment 70 may be draped over the feet of the deceased, to overlap and cover possible exposure at the ends of the first and second fabric segments 58, 62 at the feet of the deceased.

Referring again to FIG. 5, it will be appreciated that fewer cloth assemblies may be used, and still achieve some of the advantages of the embodiment disclosed herein. For example, it is possible for the first cloth assembly 48 alone have a fabric segment sufficient to cover the entire body of the deceased, and most or all of the top edges 34*c*, 36*c*, 38*c* and 40*c* of the insert 14. Alternatively, any combination of cloth assemblies may be used in other configurations. The ease of using the substrate(s) to insert and position the cloth assemblies would provide at least some benefits in such other configurations as well.

In this embodiment, after installation of the cloth assemblies 48, 50, 52, and 54, the viewing event may take place (step 165). The face of the deceased will be visible if desired, and little or no portion of the corrugated paper insert 14 will be readily visible when viewing the deceased. The viewing tray 12 provides a pleasing aesthetic external shell, and the reduced depth of the viewing tray 12 enables viewing of the face of the deceased without a bed raising mechanism.

After the viewing event of step 165, the insert 14 and the deceased human body are removed in step 170 using the reverse operation(s) of step 155. In the embodiment of FIGS. 1 and 2, the second end panel 26 is unlatched and rotated downward, and the insert 14 with the deceased is removed laterally through the resulting opening 27 on the roller assemblies 29. In addition, the cloth assemblies 48, 50, 52 and 54 are removed from the viewing tray 12. In step 170, the insert 14, the deceased human body and cloth assemblies 48, 50, 52 and 54 are also advanced to further processing, which may suitably be cremation. It would nevertheless be possible to inter the insert 14 and the deceased without cremation.

Thereafter, the viewing tray 12 may be used again. Because the viewing tray 12 is relatively lightweight and portable compared to a full, ornate rental casket, the viewing tray 12 in step 175 can optionally be moved (without any insert or deceased) to location convenient to the next viewing event, whether it is in another space in the same building or another building altogether. It is also possible to move the viewing tray 12 to a storage location, and then return the viewing tray 12 to any desired location for the next display event. Once the viewing tray is in the desired location, the process starting at step 145 may be repeated for a second deceased human body, a second insert 14, and a second interior kit 16.

Figure 8:
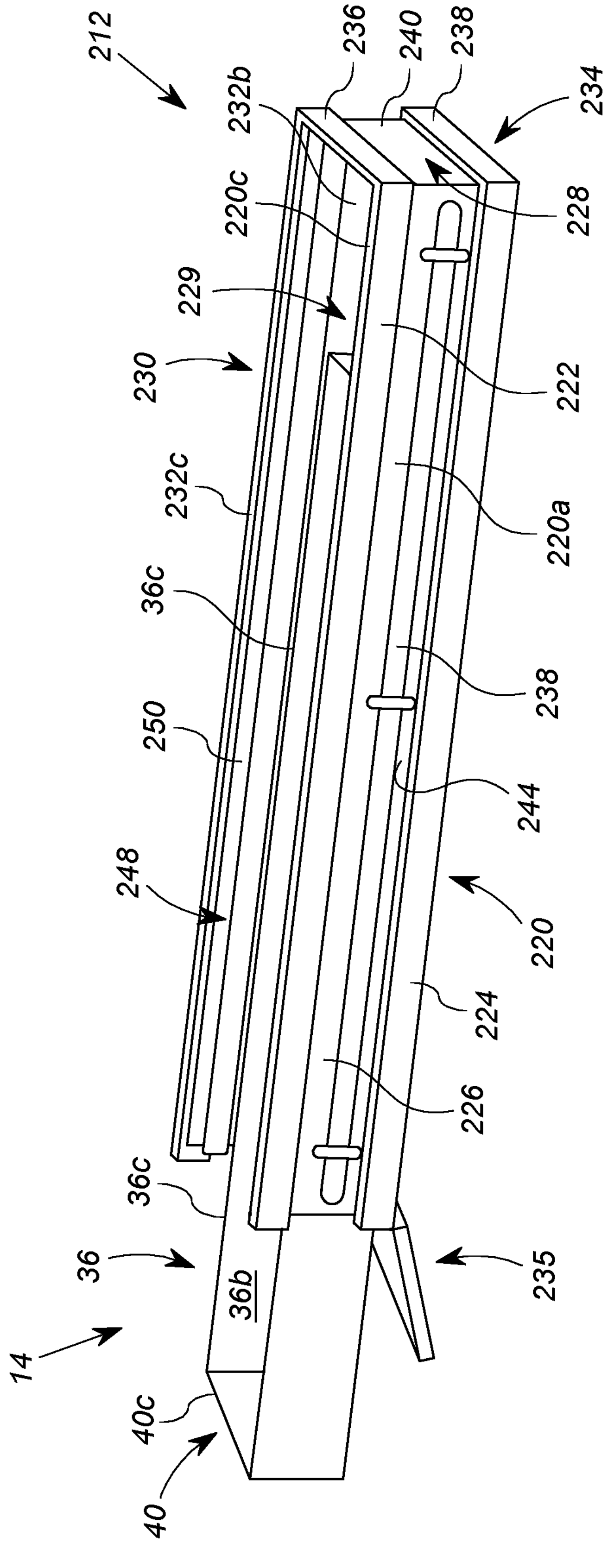
FIG. 8 shows a side perspective of an insert and an alternative viewing tray that may be used in the system of FIG. 1.

FIG. 8 shows a perspective view of an alternative embodiment of a viewing tray 212, shown in context with a partially inserted insert 14. Similar to the viewing tray 12, the viewing tray 212 includes a first side panel 220, a second side panel 232, a first end panel 234, and a second end panel 235 coupled to a bottom panel 218 to form a walled or rimmed tray. Although the second end panel 235 is shown in the open position in FIG. 8, it will be appreciated that it can be closed to extend upward from the bottom panel 18 to complete the tray 212. The panels 218, 232, 234, 235 define an interior 229. The viewing tray 212 has length and width dimensions adapted to receive and reasonably fit a deceased, adult human body in the supine position, and preferably the insert 14.

The first side panel 220 is constructed primarily (more than 50% by weight and/or volume) of wood (including engineered wood products) and/or metal, and includes an exterior surface 220*a*, an interior surface 220*b* (see FIG. 9), and a top edge 220*c*. More specifically, the first side panel 220 includes an upper frame 222, a lower frame 224, and a wooden (or metal) plate or sheet 226. Each of the frames 222, 224 in this embodiment is a wooden beam extending the entire length of the first side panel 220, with the upper frame 222 defining the top and top edge 220*c* of the first side panel 220, and the lower frame 224 defining the bottom of the first side panel 220. The wooden plate 226 is coupled to each of the frames 222, 224, and extends between them. The wooden plate 226 is thinner than either of the frames 222, 224 and sits inward of the outermost surfaces of the frames 222, 224, thereby defining a lengthwise recessed channel 244. In this embodiment, a handle 238, which may be the same design as any suitable casket handle, is disposed to vertically align with the channel 244.

The frames 222, 224 provide extra reinforcement that reduces the strength requirements of the plate 226, and thus reduce cost without sacrificing quality and reliability. The recessed channel 244 also provides an aesthetic contour.

Figure 9:
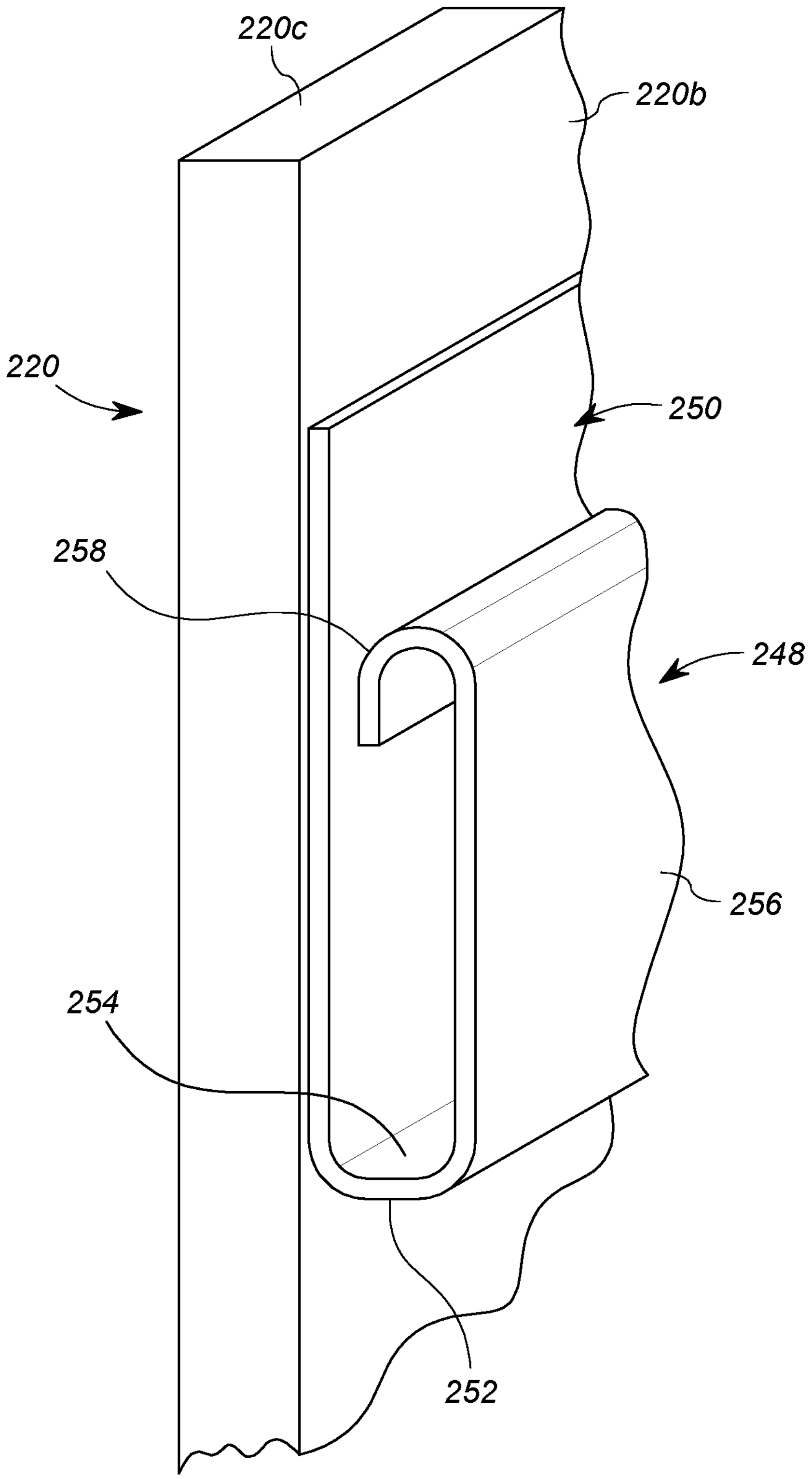
FIG. 9 shows fragmentary perspective of the viewing tray of FIG. 8.

In the embodiment described herein, one or more receptacles 248 are affixed to the interior surface 220*b* of the side panel. FIG. 9 shows a perspective fragmentary view of the side panel 220*b* with an elongated receptacle 248 attached thereto. The receptacle 248 in this embodiment is an extruded piece of material, such as plastic or polymer, that forms a hooked top channel. The receptacle 248 includes a first plate or wall 250 attached to the side panel interior surface 220*b*. The plate 250 has a length of at least half of the distance between the first end panel 234 and the second end panel 235. For example, as shown in FIG. 8, the receptacle 248 (and its plate 250) on the second side wall 222 extends nearly the entire length of the second side wall.

Referring again to FIG. 9, the receptacle 248 also includes an inward extending portion 252 having a bottom wall 254 that extends inward from the first wall 250 and a retaining wall 256 that extends upward from the end of the bottom wall 254. At the top of the retaining wall 256 is a hooked portion 258 that hooks inward (toward the first wall 250) and downward (toward the bottom wall 254).

Figure 10:
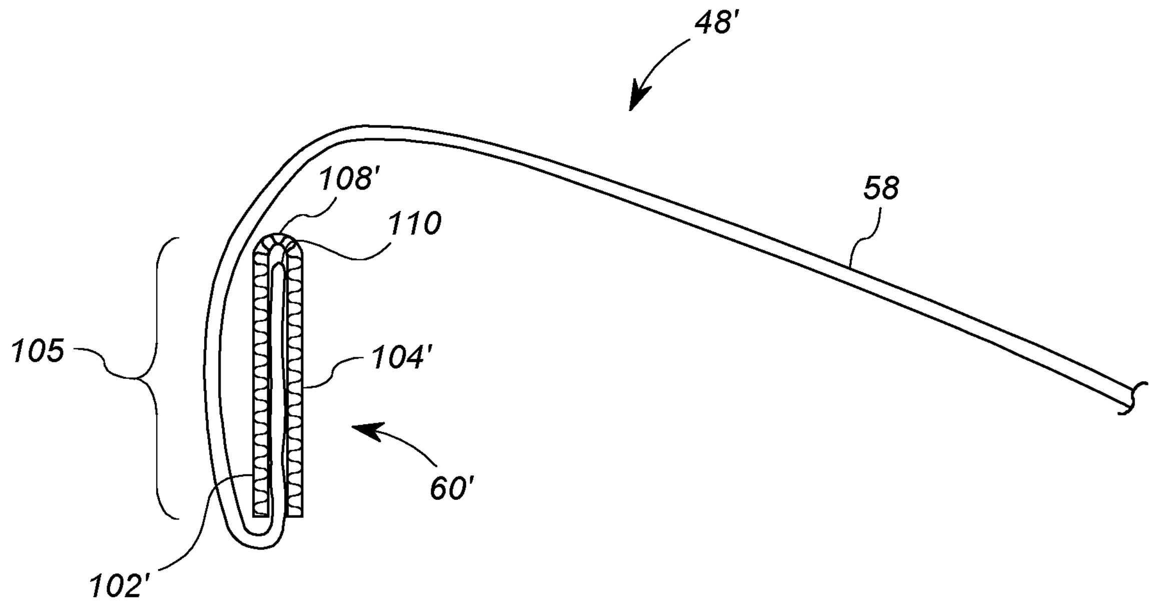
FIG. 10 shows a side plan view of an alternative cloth assembly.

In general, the receptacle 248 is configured to position and retain a cloth assembly having a substrate and a fabric segment similar to that of FIGS. 3 and 4. The receptacle 248 is positioned in this embodiment to retain a variant of the cloth assembly 48 having little or no stiffening panel 207. FIG. 10 shows an exemplary embodiment of a variant of a cloth assembly 48' that may be used with the viewing tray 12, for example, in the receptacle 248 as positioned on the interior surface 220*b* of first side wall 220. The cloth assembly 48' includes the same first fabric segment 58 as the cloth assembly 48 of FIGS. 3 and 4, but includes a modified substrate 60'. As shown in FIG. 10, the modified substrate 60' similarly comprises a lengthwise folded cardboard blank having a first portion 102' lengthwise folded along a fold edge 108' over a second portion 104'. The modified substrate 60' differs from the substrate 60 in that the second portion 104' has about the same width as the first portion 102'. As a result, the modified substrate 60' has little or no stiffening panel similar to the stiffening panel 107.

Similar to the cloth assembly 48, the first lengthwise edge 110 of the first fabric segment 58 is secured to the substrate 60' along the substrate length within a sleeve 105'. The first lengthwise edge 110 is secured such that the second lengthwise edge, not shown in FIG. 10 can be disposed beyond the lengthwise sleeve 105'.

In the embodiment of FIGS. 8 to 10, the receptacle 248 receives the substrate 60', and the first fabric segment 58 may otherwise be used as discussed above. Specifically, the substrate 60' may be inserted fully or party between the plate 250 and the retaining wall 256. The hooked portion 258 flexes out and provides inward spring action to hold the substrate 60' in place. Accordingly, in contrast to the embodiment of FIGS. 1 to 4, the receptacle 248 secures and fixes the position of the first cloth assembly 48', as opposed to trapping all or part of the substrate 60 between the insert 14 and the tray 12. It will further be appreciated that the receptacle 248 may take other forms, such as one that does not include a hooked portion 258, or one that one of multiple short clips disposed at equal heights along the length of the interior surface 220*b* of the first side wall 220.

Referring again to FIG. 8, the second side panel 232 has substantially the same structure as the first side panel 220, and has attached thereto another receptacle 248. Thus, the second side panel 232 also includes, among other things, an interior surface 232*b* and a top edge 232*c*. As shown in FIG. 8, the receptacle 248 is disposed at a vertical level that is between the top edge 232*c* and the vertical location of the top edge 36*c* of the side wall 36 of the insert 14 is located when installed. The receptacle on the first side panel 220 (FIG. 9) is located at the same vertical level. The end panels 234, 235 have receptacles similar to the receptacle 248, but having suitably reduced lengths. Accordingly, four cloth assemblies having the structure of the cloth assembly 48' may be installed in corresponding receptacles 248 (albeit with different lengths on the end panels 234, 235).

It will further be appreciated that the first end panel 234 has a structure analogous to that of the first side panel 220. The first end panel 234 includes an upper frame 236, a lower frame 238, and a plate or sheet 240, all constructed and connected in the same manner as the frames 222, 224 and plate 226 of the side panel 220, except having a shorter length. The frames 236, 238 and 240 thus form a similar recessed channel 228. The recessed channels 228 and 244 intersect with each other (as well as with corresponding recessed channels, not shown, on the second side wall 232) to define a peripheral recessed channel that extends completely around the viewing tray 12.

The second end panel 235 has the same structure as the first end panel 234, but further includes in this embodiment a hinged connection to the bottom panel 218 to all opening for insertion of the insert 14, as shown in FIG. 8.

The bottom panel 218 is substantially identical to the bottom panel 18, and thus suitably includes a similar plurality of roller assemblies having rollers configured to support and facilitate lateral movement of the insert 14. In contrast to a typical casket, the vertical distance between a top surface 18 of the bottom panel (and/or the top surface of the roller assemblies or other bottom support structure) and the top edge 220*c* of the first side panel 220 is less than 10 inches. This allows for a more convenient viewing of the face of the deceased, not shown, within the tray 212.

The alternative viewing tray 212 may be used with the insert 14 (or other suitable insert) and corresponding cloth assemblies in the process described above in connection with FIG. 5.

It will be appreciated that the above described embodiments are exemplary, and that those of ordinary skill in the art may readily devise their own implementations and modifications that incorporate the principles of the present invention and fall within the spirit and scope thereof. By way of example, it will be appreciated that various advantages of the interior kit described herein may be obtained even if a reusable shell other than the viewing tray is used, such as a traditional rental casket.

What is claimed is:

1. A funerary method, comprising:

a) disposing a deceased adult human body in supine position on an insert, the insert having side walls and end walls, at least one side wall and the end walls all having a first height;

b) providing the insert on a tray having two end panels and a plurality of side panels affixed to a bottom panel, wherein at least one of the two end panels and the plurality of panels has a contoured outer surface, and wherein a vertical distance between a top surface of the bottom panel and at least a part of a top edge of a first side panel of the plurality of side panels is less than 10 inches;

c) inserting a first edge of a first fabric segment between the first side panel of the tray and a first side wall of the insert;

d) employing at least the first fabric segment to cover at least a portion of a top edge of at least the first side wall of the insert and at least a portion of the deceased human body, such that the deceased human body is sufficiently visible for identification; and e) subsequent to step d), removing the insert and the deceased human body from the tray.

2. The funerary method of claim 1, further comprising step f) cremating the insert and the deceased human body.

3. The funerary method of claim 2, wherein step f) further comprises cremating first fabric segment with the insert and the deceased human body.

4. The funerary method of claim 3, wherein step b) further comprises:

b1) disposing the insert on the bottom panel of the tray;

b2) moving at least one of the side panels and end panels to extend upward from the bottom panel.

5. The funerary method of claim 4, wherein step b1) further comprises disposing the insert on the bottom panel of the tray while the side panels and end panels are coupled to the bottom panel.

6. The funerary method of claim 1, wherein step b) further comprises:

b1) disposing the insert on the bottom panel of the tray;

b2) moving at least one of the side panels and end panels to extend upward from the bottom panel.

7. The funerary method of claim 6, wherein step b1) further comprises disposing the insert on the bottom panel of the tray while the side panels and end panels are coupled to the bottom panel.

8. The funerary method of claim 1, wherein the insert is configured to be consumed in a cremation process.

9. The funerary method of claim 8, wherein the insert is formed from a paper material.

10. The funerary method of claim 1, wherein the tray is formed from wood.

11. The funerary method of claim 10, wherein at least one of the plurality of side panels includes an upper frame, a lower frame, and a section extending therebetween, the second having a thickness that is less than a thickness of each of the upper frame and the lower frame.

12. The funerary method of claim 11, wherein the insert is configured to be consumed in a cremation process.

13. The funerary method of claim 1, further comprising, prior to step a), separating the first fabric segment from the insert.

14. The funerary method of claim 1, wherein the first fabric segment includes a second edge opposite the first edge, and wherein after step d) at least a portion of the second edge rests on the deceased human body.

15. The funerary method of claim 1, wherein:

the first edge of the first fabric segment is coupled to a rigid substrate, and wherein step c) further comprises inserting the rigid substrate between the first side panel of the tray and the first side wall of the insert.

16. The funerary method of claim 1, wherein step b) further comprises providing the insert on the tray such that a vertical distance between a bottom surface of the insert and a top edge of at least one side panel of the tray is approximately the first height.

17. A funerary tray for displaying a deceased, comprising:

first and second side panels and first and second end panels coupled to a bottom panel to form a tray, the tray having a length and width adapted to receive and reasonably fit a deceased adult human body in the supine position, wherein a vertical distance between at least a portion of a top surface of the bottom panel and a top edge of the first side panel is less than 10 inches, each side panel constructed primarily of wood or metal and includes a first end coupled to the first end panel, a second end coupled to the second end panel, a top edge, and a bottom disposed adjacent the bottom panel, each side panel including an interior surface;

wherein at least one of the first and second end panels is configured to be moved from a position that extends upward from the bottom panel to a different position; and wherein at least one of the plurality of side panels includes an upper frame, a lower frame, and a middle section extending therebetween, the middle section having a thickness that is less than a thickness of each of the upper frame and the lower frame.

18. The funerary tray of claim 17 wherein the second end panel is rotatably coupled to the bottom panel, and further comprising a plurality of rollers on the bottom panel.

19. A funerary tray for displaying a deceased, comprising:

first and second side panels and first and second end panels coupled to a bottom panel to form a tray, the tray having a length and width adapted to receive and reasonably fit a deceased adult human body in the supine position, wherein a vertical distance between at least a portion of a top surface of the bottom panel and a top edge of the first side panel is less than 10 inches, each side panel including a first end coupled to the first end panel, a second end coupled to the second end panel, a top edge, and a bottom disposed adjacent the bottom panel, each side panel including an interior surface; and a first receptacle affixed to the interior surface of the first side panel, the receptacle configured to position and retain a removable fabric segment, the first receptacle including a first plate attached to the interior surface, a bottom wall that extends inward from the first plate, and a retaining plate that extends upward from an end of the bottom wall.

20. The funerary tray of claim 19, wherein in the receptacle has an additional portion extending in part from of the retaining plate toward the interior surface.

* * * * *